United States Patent
Hermony

(10) Patent No.: US 12,461,046 B2
(45) Date of Patent: Nov. 4, 2025

(54) X-RAY COMPUTED TOMOGRAPHY (CT) SCANNER

(71) Applicant: MULTICT IMAGING LTD, Caesarea (IL)

(72) Inventor: Nathan Hermony, Caesarea (IL)

(73) Assignee: MULTICT IMAGING LTD, Caesarea (IL)

( * ) Notice: Subject to any disclaimer, the term of this patent is extended or adjusted under 35 U.S.C. 154(b) by 238 days.

(21) Appl. No.: 18/278,744

(22) PCT Filed: Mar. 2, 2022

(86) PCT No.: PCT/IB2022/051841
§ 371 (c)(1),
(2) Date: Aug. 24, 2023

(87) PCT Pub. No.: WO2022/185231
PCT Pub. Date: Sep. 9, 2022

(65) Prior Publication Data
US 2024/0142392 A1    May 2, 2024

Related U.S. Application Data

(60) Provisional application No. 63/156,382, filed on Mar. 4, 2021.

(51) Int. Cl.
*G01N 23/046* (2018.01)
*A61B 6/03* (2006.01)
*A61B 6/40* (2024.01)

(52) U.S. Cl.
CPC ........... *G01N 23/046* (2013.01); *A61B 6/032* (2013.01); *A61B 6/035* (2013.01); *A61B 6/4007* (2013.01); *A61B 6/4014* (2013.01); *G01N 2223/3303* (2013.01); *G01N 2223/3308* (2013.01); *G01N 2223/419* (2013.01)

(58) Field of Classification Search
CPC ...... G01N 23/046; A61B 6/032; A61B 6/035; A61B 6/4007; A61B 6/4014
See application file for complete search history.

(56) References Cited

U.S. PATENT DOCUMENTS

| | | | |
|---|---|---|---|
| 4,115,696 A | 9/1978 | Truscott | |
| 4,150,293 A | 4/1979 | Franke | |
| 5,361,291 A | 11/1994 | Toth et al. | |
| 6,233,304 B1 | 5/2001 | Hu et al. | |
| 6,435,714 B1 * | 8/2002 | Bruder | A61B 6/032 378/197 |
| 6,597,759 B2 | 7/2003 | Mazess et al. | |
| 7,466,792 B2 * | 12/2008 | Bakai | A61N 5/10 378/65 |
| 2003/0076920 A1 * | 4/2003 | Shinno | A61B 6/4014 378/4 |

(Continued)

*Primary Examiner* — Chih-Cheng Kao
(74) *Attorney, Agent, or Firm* — The Law Office of Joseph L. Felber

(57) ABSTRACT

An X-ray computed tomography (CT) scanner includes a plurality of X-Ray sources and detectors mounted about an opening where scanning takes place. The X-Ray sources and detectors are arranged to oscillate back and forth in opposing first and second rotational directions about the opening, or in the same rotational direction about the opening, in order to generate a cross-sectional image of an object located within the opening.

29 Claims, 12 Drawing Sheets

(56) References Cited

U.S. PATENT DOCUMENTS

| | | |
|---|---|---|
| 2005/0175143 A1* | 8/2005 | Miyazaki .............. A61B 6/032 378/19 |
| 2005/0190878 A1* | 9/2005 | De Man .............. A61B 6/4028 378/9 |
| 2006/0210015 A1 | 9/2006 | Pelc et al. |
| 2007/0147576 A1 | 6/2007 | Yamazaki |
| 2007/0189444 A1 | 8/2007 | Van Steven-Daal et al. |
| 2008/0056436 A1 | 3/2008 | Pack et al. |
| 2008/0123804 A1* | 5/2008 | De Man ................ A61B 6/032 378/9 |
| 2009/0161816 A1* | 6/2009 | De Man .............. A61B 6/4028 378/92 |
| 2010/0322498 A1 | 12/2010 | Wieczorek et al. |
| 2011/0280367 A1 | 11/2011 | Baeumer et al. |
| 2012/0257710 A1 | 10/2012 | Funk et al. |
| 2013/0235971 A1 | 9/2013 | Oreper et al. |
| 2015/0305697 A1* | 10/2015 | Tamura ................ A61B 6/035 378/5 |
| 2017/0340296 A1 | 11/2017 | Shin et al. |
| 2019/0099148 A1 | 4/2019 | Rupcich et al. |
| 2019/0113435 A1 | 4/2019 | Cao et al. |
| 2019/0188849 A1 | 6/2019 | Reicher et al. |
| 2020/0187882 A1 | 6/2020 | Mohammadi |

\* cited by examiner

|  | SET 1 | SET 2 | SET 3 | SET 4 | SET 5 | SET 6 |
|---|---|---|---|---|---|---|
| GROUP 1 | 1 | 7 | 13 | 19 | 25 | 31 |
| GROUP 2 | 2 | 8 | 14 | 20 | 26 | 32 |
| GROUP 3 | 3 | 9 | 15 | 21 | 27 | 33 |
| GROUP 4 | 4 | 10 | 16 | 22 | 28 | 34 |
| GROUP 5 | 5 | 11 | 17 | 23 | 29 | 35 |
| GROUP 6 | 6 | 12 | 18 | 24 | 30 | 36 |

X-RAY COMPUTED TOMOGRAPHY (CT) SCANNER

TECHNICAL FIELD

Embodiments of the invention relate to an X-ray computed tomography (CT) scanner, and in particular to such scanners with multiple X-Ray sources and detectors.

BACKGROUND

X-ray computed tomography (CT) scanners enable non-destructive three-dimensional visualization of internal structures. Typical CT scanners work in single-mounted X-Ray source and Detector. They rotate 360 degrees continuously to image the whole body. CT scanners use computer-processed combinations of multiple X-ray measurements taken from different angles in order to produce tomographic cross-sectional images, i.e. "slices", of a body. In order to reconstruct a "slice" at least 180 degrees of scanned data is normally need, and typically also the fan beam angle is added to the rotational motion that is required for providing a "slice" (e.g. 180 degrees of scanned data to produce a "slice" normally means that in essence 180 degrees plus the fan beam angle were need for the "slice" reconstruction).

In recent year's speed of rotation in CT scanners were increased to improve temporal resolution e.g. when imaging body organs that undergo contractions, such as the heart that undergoes heartbeat contractions in sub seconds. Such increased speeds create complexities in the design of such CT scanners, due to higher accelerations and the like, and the need to use larger X-ray tubes and power in order to reach e.g. acceptable Signal to Noise ratio per pixel and per angular view while rotating fast.

Other solutions aimed at improving temporal resolution of CT scanners include, e.g., use of two X-ray tubes and two detectors mounted in 90 degrees one from the other. Such systems nevertheless typically still undergo full rotations in high speeds.

In recent years CT scanners are using detectors with multi slices, or as herein termed "slice data", in every rotation. Most commonly there are 16, 64, 256 but there are many different detectors with less or more slices. So each rotation of 360 degrees or 180 degrees plus fan creates set of slices.

Additional available solutions of CT scanners include the so-called inverse-geometry CT architecture, that makes use of multiple X-RAY sources distributed peripherally along the circumference of the scanner to cover different portions of the FOV. While in conventional CT systems, x-rays are emitted from a small area and irradiate a large-area detector, in inverse-geometry CT architecture x-ray sources are distributed over a large area, with each beam irradiating a small-area detector. Thus in inverse-geometry CT architecture proportional reduction in the detector xy-dimension can be obtained that may be a cost advantage.

A photon-counting CT system is a technology that uses a photon-counting detector (PCD) to register interactions of individual X Ray photons. PCD based scanners utilize various detectors for registering such interactions, the most common ones being Cadmium Tellurium (Cad Tel) or CZT (Cadmium, Zinc & Tellurium). This technology has benefits, such as reduction in electronic noise, increased contrast-to-noise ratio with iodinated contrast material and radiation dose efficiency and more.

The solid-state detectors like Cad Tel or CZT measure the X-Ray in a direct conversion (as opposed to scintillators where x-ray creates light which afterwards is translated to electrical signal). Existing limitations of PCD technology include e.g. the ability to handle high x-ray flux while counting each photon, and e.g. the high rotational speed that requires a large x-ray tube and respective high power.

SUMMARY

The following embodiments and aspects thereof are described and illustrated in conjunction with systems, tools and methods which are meant to be exemplary and illustrative, not limiting in scope.

In an aspect of the present invention there is provided an embodiment of an X-ray computed tomography (CT) scanner that includes multiple X-Ray tubes and detectors. Such combination of multiple X-Ray tubes and detectors may be distributed peripherally about an opening where scanning takes place and the multiple detectors, may be of various types, such as inverse geometry detectors, full size detectors (and the like).

CT scanner embodiments of the present disclosure are arranged to rotate about an axis of rotation that passes through the opening where scanning takes place—and the various CT scanner embodiments described herein may be arranged to provide scanned "slice data" of an object within the opening while rotating less than about 360 degrees and preferably less than about 180 degrees about the scanner's axis or rotation.

It is noted that references made herein to provision of a scanned "slice data" may be equally understood as generally simultaneous provision of several "slices" along the scanner's axis of rotation that are generally one aside to the other.

In certain embodiments, such detectors may possibly be based on solid state detectors using photon counting or existing technology detectors using scintillators in a current mode or photon counting (or the like). In at least certain embodiments, CT scanners of the present invention may be suited for use with detectors that are based on photon counting, since using several X-Ray tubes (e.g. more than two) with lower power than a single tube for performing a scan may reduce the likelihood for occurrence of saturation in such detectors, that may be the case if a single high power X-Ray tube source were to be used.

X-Ray tubes used in the various CT scanner embodiments disclosed herein, may employ various technologies, like the current conventional Tubes with hot cathode, cold cathode (or the like).

In certain CT scanner embodiments the number of detectors being used may be less than the number of X-Ray tubes that are used. Thus, a few X-Ray tubes may be arranged together as a "set" to emit X-ray radiation towards a common similar detector. X-Ray tubes within a "set" may be controlled to emit radiation independently from other X-Ray tubes within the "set", and hence an X-ray tube within a "set" may be controlled to be fired towards its associated detector alone or substantially at a generally similar instance as other X-ray tubes within the "set". X-Ray tubes within a "set" may be located circumferentially adjacent one to the other, however in certain embodiments certain tubes may not necessarily be circumferentially adjacent to other tubes of their "set".

In one example, an embodiment of an X-ray computed tomography (CT) scanner may be arranged to include twelve X-Ray tubes and four detectors, wherein each detector may be arranged to detect scans made by a respective "set" of three X-Ray tubes.

In an aspect of the present invention, an embodiment of an X-Ray computed tomography (CT) scanner may be provided in which switching on (i.e. activation) of X-Ray tubes may be performed sequentially.

Sequential activation may be embodied by arranging tubes to be activated one after the other. In certain cases, tubes in a CT scanner may be arranged in "groups" that are arranged to be activated substantially at the same instance, where each "group" of tubes may be sequentially activated after another "group". X-ray tubes belonging to the same "group" do not necessarily belong to the same "set".

Such sequential activation may permit use of multiple X-Ray tubes with relative low power vs e.g. a CT scanner that is arranged to include a single Large X-Ray tube—and thus in other words the power of a single relative high power X-Ray tube in a conventional CT scanner may be seen as being divided between a few lower powered X-Ray tubes.

Benefits in such arrangements where sequential activation of X-Ray tubes is performed, may be seen e.g. in the further reduction of likelihood of occurrence of saturation in the case of use of photon counting detectors. Such saturation may accordingly have a higher chance of occurring if a single high power X-Ray tube source were to be used. For example, in case where a CT scanner embodiment of the present invention makes use of 12 X-Ray tubes, the power of each single tube may be substantially low, e.g. about $1/12$ of the power of a single tube if such were to be used.

Thus at least certain CT scanner embodiments of the present invention may be useful in enabling use of solid-state detectors with relative limited count rate capability.

In certain embodiments an X-ray computed tomography (CT) scanner may be used in a continuous mode i.e. where rotation (or rotations) about an axis of rotation of the scanner is (are) in the same direction. For example, a CT scanner with 36 X-Ray tubes and 36 detectors may be arranged to rotate an angle "alpha" of e.g. about 10 degrees (in this example computed by dividing 360 degrees by 36 detectors) in a given rotational direction in order to substantially provide a full scanned "slice data" of an object, and then repeat additional "alpha" sized rotational motions in the same given rotation direction in order to obtain further "slice data" of the object being scanned. Use of a plurality of X-ray tubes in such one directional rotational scanners facilitates obtaining required temporal resolutions with lower speeds.

In an aspect of the present invention, an X-ray computed tomography (CT) scanner may be provided that rotates back and forth in an oscillating manner in opposing first and second rotational directions about an axis of rotation of the scanner in order to improve temporal resolution while reducing complexity of design. Possibly, the oscillating angular range doesn't have to necessarily fit with the angular distance between circumferentially adjacent tubes.

Radiation "flux" (RF) is computed by multiplying the 'electrical current' (EC) supplied to an X-ray tube by its exposure time (ET)—i.e. RF≈EC×ET. In certain cases, while accelerating/decelerating, e.g. in an "oscillating" type CT scanner embodiment, such CT scanner(s) may be arranged to control the flux emitted by X-Ray tubes relative to the CT scanner's accelerating/decelerating—in order to maintain substantial similar flux of radiation during angular motion.

For example, when starting to rotate from a static position at a relative slow speed of rotation, the 'electrical current' (EC) supplied to an X-ray tube may be controlled to be lower than when the CT scanner rotates at higher speeds where the 'electrical current' (EC) supplied to same X-ray tube may be controlled to be higher—in order substantially maintain a constant emission of flux during rotation of the CT scanner.

Such CT scanner embodiments may be arranged to include multiple X-Ray tubes and detectors to provide improved temporal resolution while rotating in slower speeds. The X-Ray tubes may be distributed such that a full scanned "slice data" may be provided while the scanner rotates less than 360 or even less than 180 degrees about its axis of rotation.

In an embodiment, substantially all X-Ray tubes may be arranged to be fired at least once (in a sequential or non-sequential manner) while rotating in the first rotational direction, and substantially all X-Ray tubes may be arranged to be fired again at least once (in a sequential or non-sequential manner) while rotating back in the opposing second rotational direction. Such back and forth oscillation may be executed in order to perform imaging of a full whole-body (WB) or part of the WB, in relative lower rotational speeds. It is noted that the number of X-Ray tubes being "fired" or not may depend on various criteria, such as when the size of an organ being scanned is relatively small (e.g. a human brain) than in certain cases not all tubes will be "fired" (e.g. to provide the so-called adaptive FOV discussed herein below)

For example, in a CT scanner embodiment including 12 X-Ray tubes that are spaced apart one from the other by about an angular spacing A1 in this example of about 30 degrees (i.e. A1=360/12) around the scanner's axis of rotation, and 4 detectors spaced apart one from the other by about an angular spacing A2 in this example of about 90 degrees (i.e. A2=360/4) around the scanner's axis of rotation—a full "slice data" of a scanned object may be obtained while rotating an angle "alpha" of between about A1 (here about 30°) and about A2 (here about 90°) around the object in a first rotational direction, and then rotating back by about said same angle "alpha" in an opposing second rotational direction.

And therefore, a rotational speed of such an embodiment may be about 12 times lower than a CT scanner with a single X-Ray tube that rotates 360 degrees about the object to obtain one scanned "slice data" and that provides a similar temporal resolution.

In an aspect of the present invention, an X-ray computed tomography (CT) scanner may thus be provided in which smaller ("alpha") angular rotations of an assembly of multi-X-Ray tubes and detectors enables a shorter temporal resolution. Such relative small angular rotations that provide scans of "slice data" of an object may be performed in oscillations or as aforementioned in previous embodiments in the same rotational direction (e.g. a CT scanner having e.g. 12 tubes and 4 detectors may rotate a small angular rotation "alpha" in rotational direction R to obtain "slice data" of a scanned object, e.g. between about 30 and 90 degrees in this example, and then an additional "alpha" sized rotational motion in the same rotational direction to obtain another "slice data" of the object (etc.). Such "alpha" sized" rotational motions that may substantially provide sets of "slice data" of an object may enable imaging of organs in dynamic mode, such as the heart, in a dynamic mode where a plurality of scanned "slice data" per heartbeat are obtained without requiring fast rotational speeds.

For example, in a heartbeat of 60 BPM—every second the heart completes a full cycle from end diastole to end systole and back, and thus to capture sufficient scanned data during such a full cycle a scanner should preferably exhibit a temporal resolution of about 0.2 seconds in order to capture about 5 "slice data" during the heart's full cycle.

To achieve such a temporal resolution of about 0.2 seconds, a CT scanner having a single X-Ray tube that performs 360 degree scans about an object to provide a "slice data", should rotate at about 300 RPM (300 rounds per minute=5 rounds per second=temporal resolution of 0.2 seconds) and thus be exposed to relative large accelerations and relative high flux to obtain a good SNR.

In X-ray computed tomography (CT) scanner embodiments of the proposed invention that e.g. make use of 12 X-Ray tubes and 4 detectors, such similar temporal resolution of about 0.2 seconds may be achieved in this example according to the number of X-Ray tubes at rotations of about 25 RPM (300 RPM/12=25 RPM) and according to the number detectors at rotations of about 75 RPM (300 RPM/4=75 RPM)—and thus a flux per pixel may also be between about 12 (acc. to tubes) to 4 (acc. to detectors) times lower than with a regular fast rotating CT scanner.

In certain cases, the heartbeat of a sick person may rise to about 120 BPM and thus in order to obtain 5 cycles of the heart per second a temporal resolution of about 0.1 seconds may be required. This may translate in a conventional CT scanner system to a required rotational speed of about 600 RPM—while in the discussed embodiment of the present invention that includes 12 X-Ray tubes and 4 detectors, a rotational speed of between about 50 to 150 RPM may be sufficient in order to obtain such temporal resolution of about 0.1 seconds.

In an aspect of the present invention, an X-ray computed tomography (CT) scanner may be provided for imaging heart calcium scoring. Current guidelines for imaging Heart calcium scores may require imaging the heart at rates of about 0.5 seconds per rotation, which translates to rotation at a speed of about 120 RPM. With the discussed embodiments of the present invention that include e.g. 12 X-Ray tubes and 4 detectors, a similar temporal resolution may be achieved with rotations of between about 10 to 30 RPM (i.e. 120/12 or 120/4).

Such lower rotational speeds that may be required in CT scanner embodiments of the present invention, may simplify complexity of mechanics that supports such rotations. For example, slip rings (in particular in the case of an oscillating scanner), high power electrical motors and other expensive components that may be required in CT scanners that require 360 degree rotational motion to provide one set of scanned "slice data", may not be necessary in embodiments of the present invention that perform only partial "alpha" sized rotations to obtain one set of scanned "slice data".

Such embodiments may accordingly also enable use of Solid State detectors and reduce or substantially eliminate the saturation count rate, since the lower speeds of rotation and the multiple X-Ray tubes being used and due to use of more efficient solid state detectors may allow using X-Ray tubes with lower power.

In an aspect of the present invention, an X-ray computed tomography (CT) scanner may make use of AI (Artificial Intelligence) based reconstruction methods to complete partial views and thus reduce even more the rotational angle and/or the number of X-Ray tubes. This can either reduce the "alpha" angle of rotation or reduce the number of tubes.

The above embodiments thus provide the advantages of:

Rotating an assembly of multi X-Ray tubes and detectors in much smaller angles and speeds, which enables shorter temporal resolutions useful for imaging e.g. dynamic objects, such as the heart, without the complexity of the design of conventional systems.

Eliminating the need of complex elements typically required in the design of conventional systems, such as slip ring(s), and the complexity of transmitting data and power through it.

The Multi X-Ray tubes and the sequential switching/activation of such X-Ray tubes, may lower power consumption and thus the need for relative High Voltage supply. Due to the back and forth rotational motion of relative small angles, the Voltage supply can be mounted outside of the Rotation unit (rotor) of the CT scanner e.g. on the static gantry, electrical cabinet (or the like).

The fact that only few X-Ray tubes are switched at a time reduces the total radiation and enables using Photon Counting Detectors with lower flux that reduces the saturation count rate and also reduces the requirements for room shielding.

The back and forth rotational motion of embodiment of the present invention, enables, Dynamic, WB imaging and measuring calcium scoring with a much smaller and affordable CT scanning devices. And the use of AI can further improve temporal resolution (smaller angle of rotation).

In addition to the exemplary aspects and embodiments described above, further aspects and embodiments will become apparent by reference to the figures and by study of the following detailed descriptions.

BRIEF DESCRIPTION OF THE FIGURES

Exemplary embodiments are illustrated in referenced figures. It is intended that the embodiments and figures disclosed herein are to be considered illustrative, rather than restrictive. The invention, however, both as to organization and method of operation, together with objects, features, and advantages thereof, may best be understood by reference to the following detailed description when read with the accompanying figures, in which.

Figure 1A:
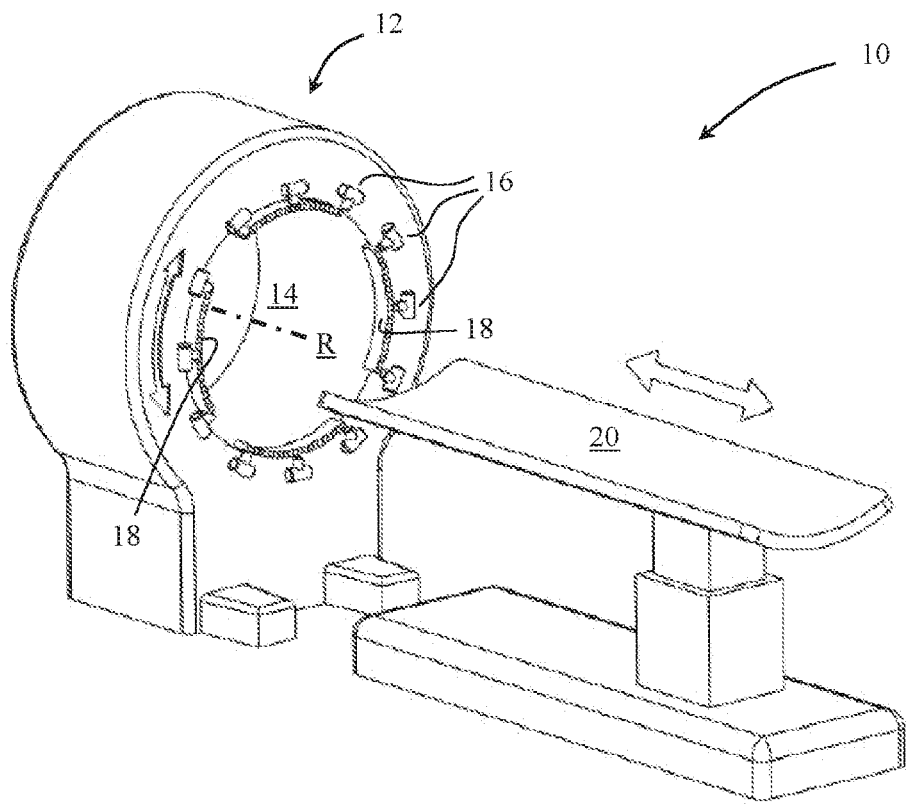
FIGS. 1A and 1B schematically show an embodiment of an X-ray computed tomography (CT) scanner in perspective and frontal views, respectively.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated within the figures to indicate like elements.

DETAILED DESCRIPTION

Figure 1B:
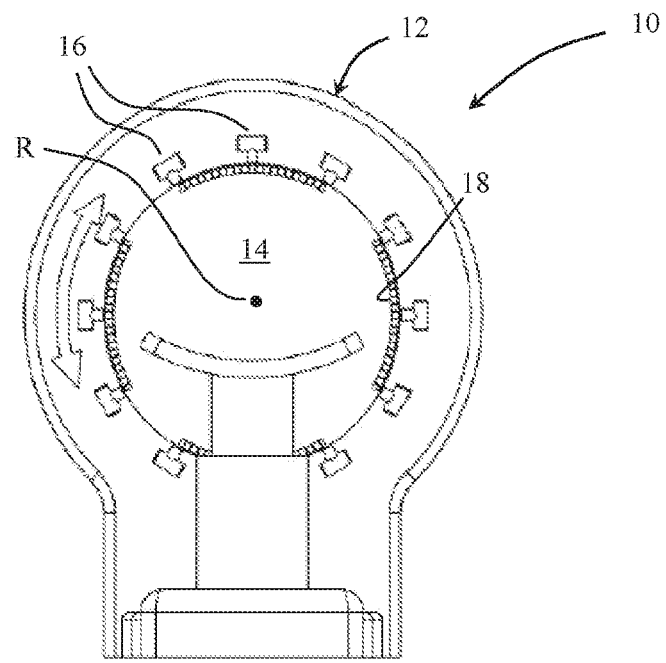

Attention is first drawn to FIGS. 1A and 1B schematically showing an embodiment of an X-ray computed tomography (CT) scanner 10 in perspective and frontal views, respectively.

CT scanner 10 includes a circular frame 12 that defines a volume useful field of view (FOV) 14 where scanning takes place. The frame includes a plurality of X-ray tubes 16 and opposing X-ray detectors 18 formed about FOV 14 and about an axis of rotation R of the scanner that passes through FOV 14, and the scanner includes a table platform 20 for advancing a patient through the scanning volume where computer-processed combinations of multiple X-ray measurements are taken to produce tomographic images of the body of the patient being scanned.

Figure 2:
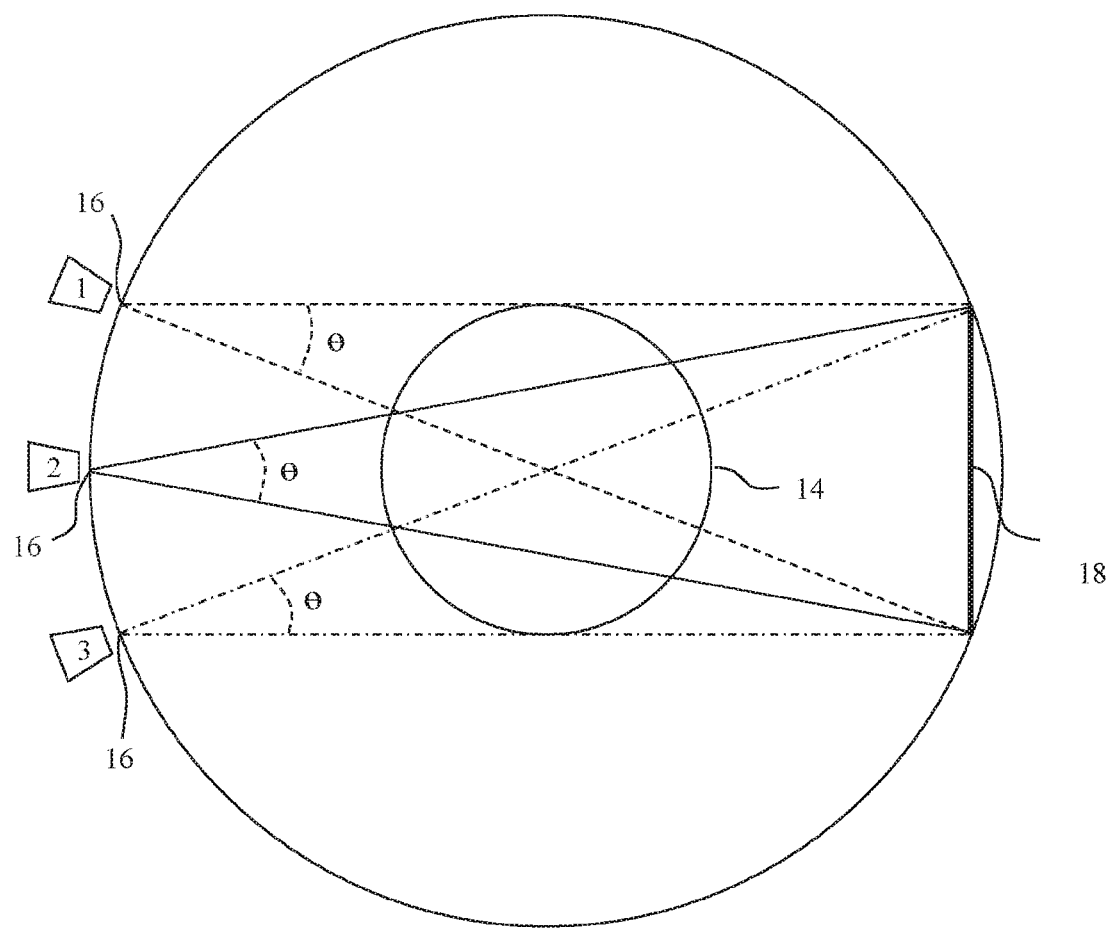
FIG. 2 schematically shows an embodiment of an X-ray computed tomography (CT) scanner, or part of such a CT scanner, illustrating three X-Ray sources and an opposing detector.

Attention is drawn to FIG. 2 illustrating a portion of a CT scanner showing a "set" three X-ray tubes 16, tagged 1, 2, 3; that are configured to emit X-ray radiation towards an opposing associated common detector 18 that is arranged to measure the flux, spatial resolution, Energy resolution, and/or other properties of X-rays emitted by the X-ray tubes.

Figure 3A:
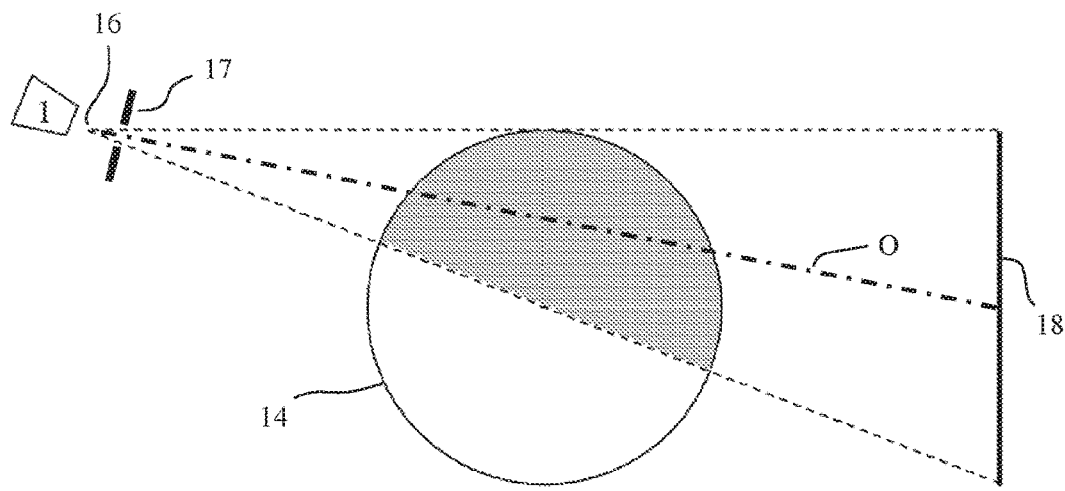
FIGS. 3A to 3C schematically show respective regions within a scanning volume of the CT scanner that can be scanned by different X-Ray sources of the CT scanner.
Figure 3B:
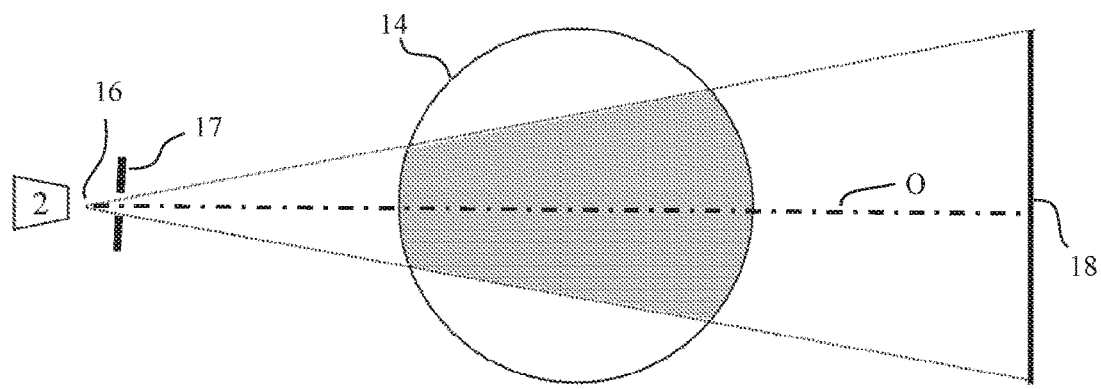
Figure 3C:
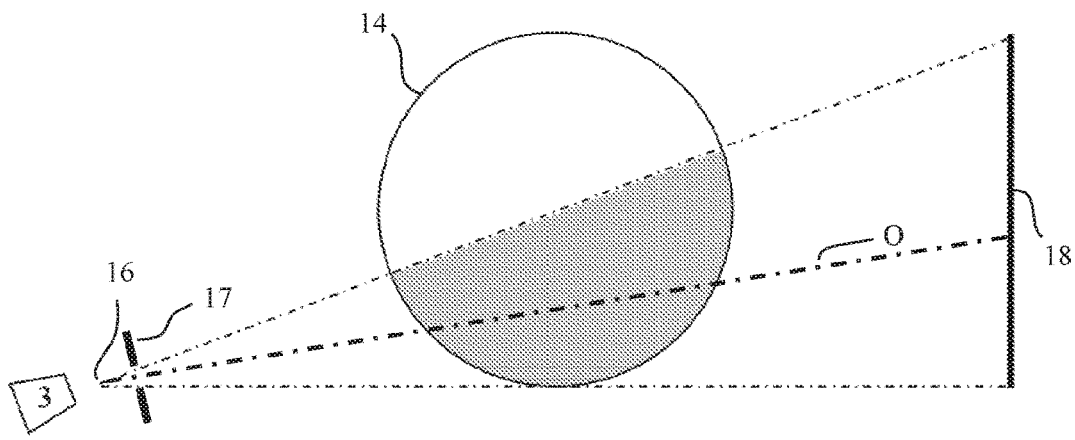

Such measurements made at detector 18 are arranged to provide scanned "slice data" (or parts of "slice data") relating to objects present within FOV 14. FIGS. 3A to 3C schematically show respective scan regions within FOV 14 seen in FIG. 2, that are scanned by different X-Ray sources tagged 1, 2, 3 of the CT scanner. As seen in FIGS. 3A to 3C, the X-Ray sources 16 and detector 18 are arranged to provide substantial full coverage of FOV 14 at least from the direction they are aimed at FOV 14.

A fan angle θ may be collimated by a collimator 17 for each X-ray beam being emitted by an X-ray source. In certain cases, the collimator may be controlled to change the fan angle of its associated X-ray source and/or to control the direction that an optical axis O along which the X-ray beam is emitted from the X-ray source points. In certain cases, the direction that an optical axis O along which a beam emitted from a given X-ray source may advance—may be controlled by tilting the given X-ray tube together with its associated collimator that can be possibly also controlled to change the fan angle of the given X-ray tube.

Figure 4:
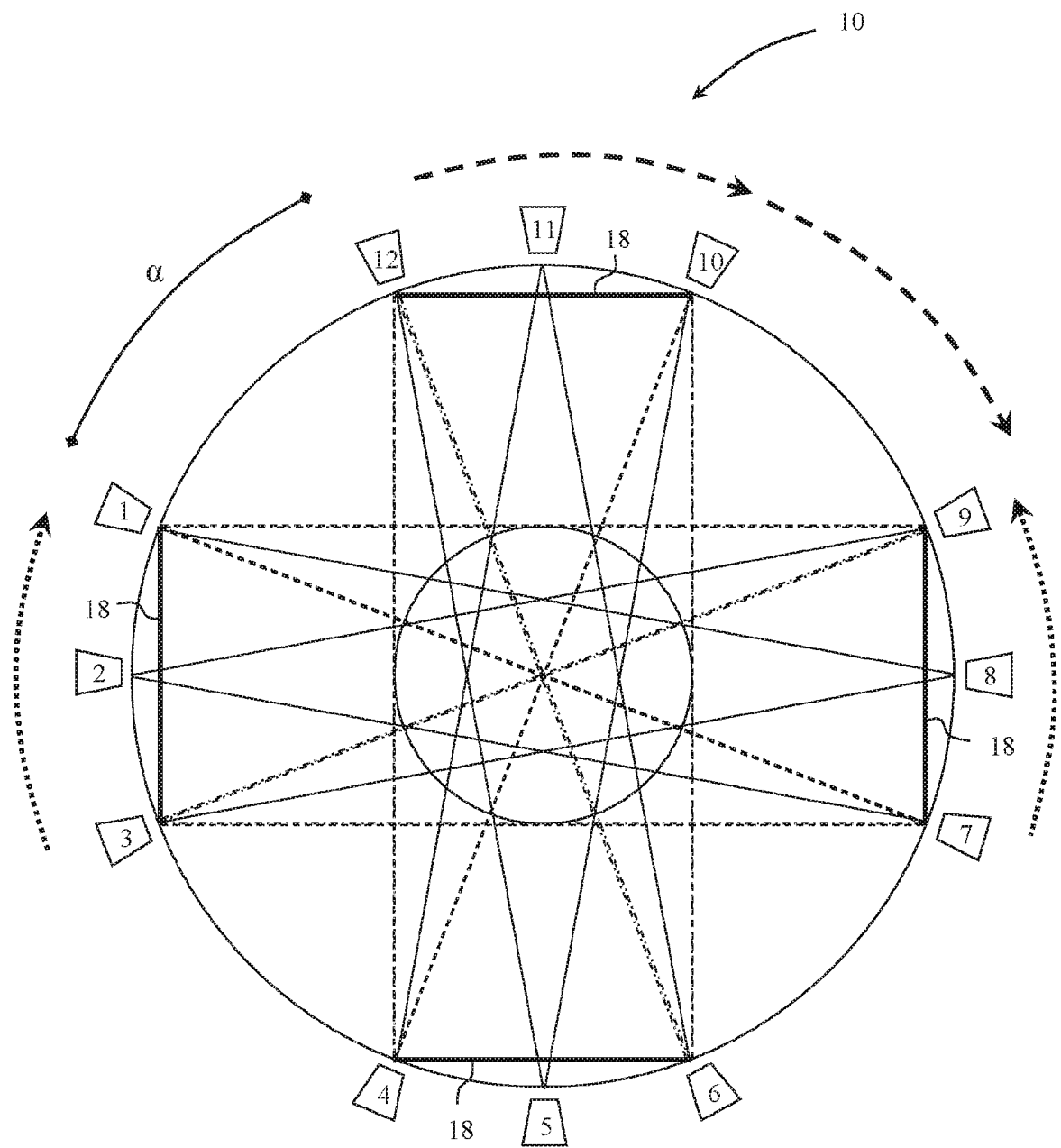
FIG. 4 schematically shows an embodiment of an X-ray computed tomography (CT) scanner including twelve X-Ray sources and four detectors, where each set of three X-Ray sources has an opposing detector.

Attention is drawn to FIG. 4 schematically showing an embodiment of an X-ray computed tomography (CT) scanner 10 including twelve X-Ray sources, tagged 1 to 12. In this example, The CT scanner is arranged such that "sets" of three adjacent X-Ray sources (see, e.g., X-Ray sources tagged: 1-3, 4-6, 7-9 and 10-12) are arranged each to emit X-Ray radiation towards an opposing associated common detector 18.

Each one of the "sets" of X-Ray sources and associated detectors seen in FIG. 4—may be generally similar to the set of X-ray sources and associated detector seen in FIG. 2 and the resultant scan regions seen in FIGS. 3A to 3C.

In certain embodiments, X-ray computed tomography (CT) scanners of the present invention may be arranged to perform incremental "alpha" sized rotational motions in a given rotational direction about axis R in order to capture during each such "alpha" sized rotation a single "slice data" scan of an object. In certain cases, CT scanners may be arranged to repeat such "alpha" sized rotational motions in the same given rotational direction as indicated by the 'dashed' arrows in FIG. 4 in order to scan additional sets of "slice data" of the object.

In other embodiments, X-ray computed tomography (CT) scanners of the present invention may be arranged to oscillate in such "alpha" sized rotational motions back and forth about axis R in order to capture subsequent sets of "slice data" of an object as indicated by the 'dotted' arrows in FIG. 4. In certain cases, such back and forth oscillating rotational motions may be in different angular rotations, e.g. any multiplier of "alpha" (so that the back and forth oscillation can have a wider angle compared to "alpha"). Preferably such "alpha" sized rotational motions (either in the same direction or in oscillations) may be less than about 360 degrees, in order to perform scanning of "slice data", and for example less than about 180 degrees possibly plus the fan angle.

Figure 5A:
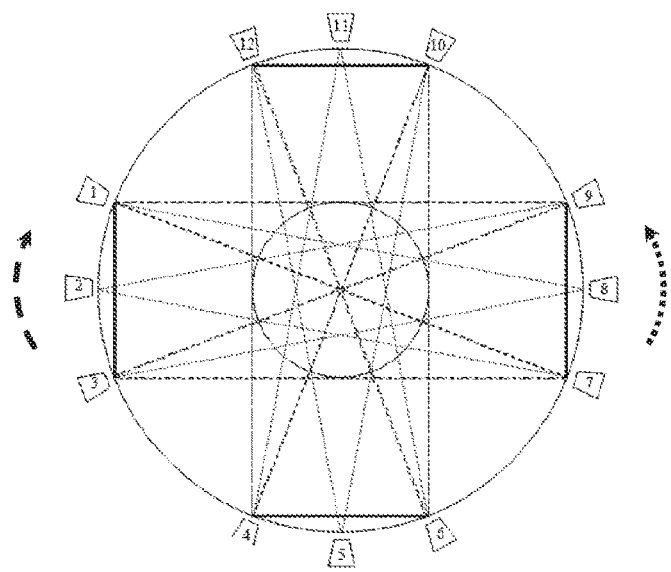
FIGS. 5A to 5C schematically show an embodiment of an X-ray computed tomography (CT) scanner during an oscillating scanning process.
Figure 5B:
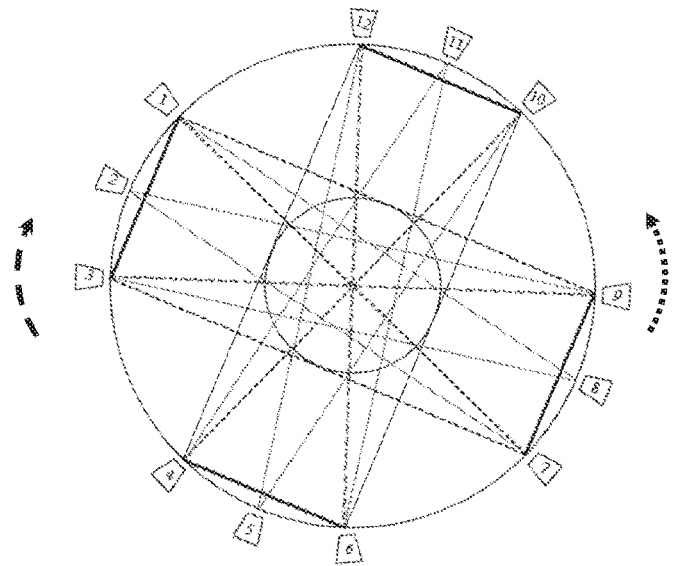
Figure 5C:
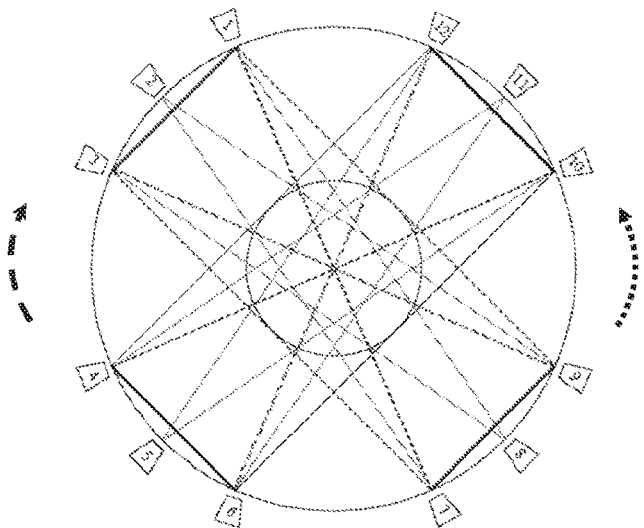

Attention is drawn to FIGS. 5A to 5C illustrating a back and forth oscillating motion that may be performed in certain embodiments by an X-ray computed tomography (CT) scanner 10 such as that seen and discussed with respect to FIG. 4.

The 'dashed' arrows on the left hand side of the figures demonstrate rotational motion of the CT scanner in a first clock-wise rotational direction from the position seen in FIG. 5A to the position seen in FIG. 5C. The 'dotted' arrows on the right hand side of the figures demonstrate a return rotational motion of the CT scanner in a second counter clock-wise rotational direction from the position seen in FIG. 5C to the position seen in FIG. 5A. The rotational motion of the CT scanner e.g. from its state seen in FIG. 5A to the state seen in FIG. 5C may be seen as the discussed "alpha" sized rotational motion (see marked in FIG. 4) that is suitable for obtaining scanned "slice data" of an object. In "non-oscillating" CT scanner embodiments that repeat performing such "alpha" sized rotational motions in the same rotational direction, the scanner may continue to perform such "alpha" sized rotational motions from the position reached in FIG. 5C in the same rotational direction indicated by the 'dashed' arrows in order to capture additional sets of "slice data" of the object.

Figure 6A:
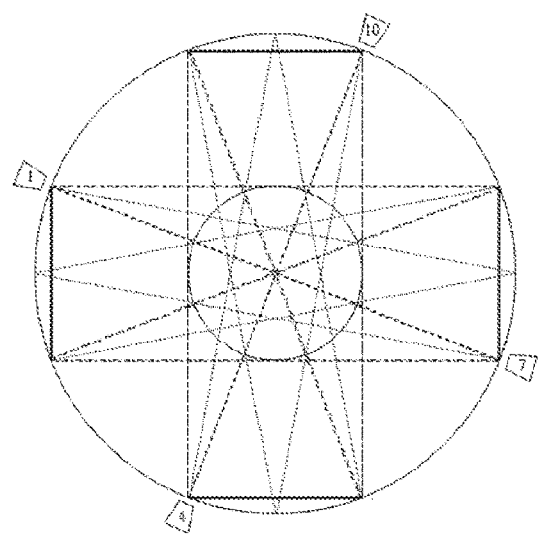
FIGS. 6A to 6C schematically show an embodiment of an X-ray computed tomography (CT) scanning process where groups of X-Ray tubes are sequentially switched on and off.
Figure 6B:
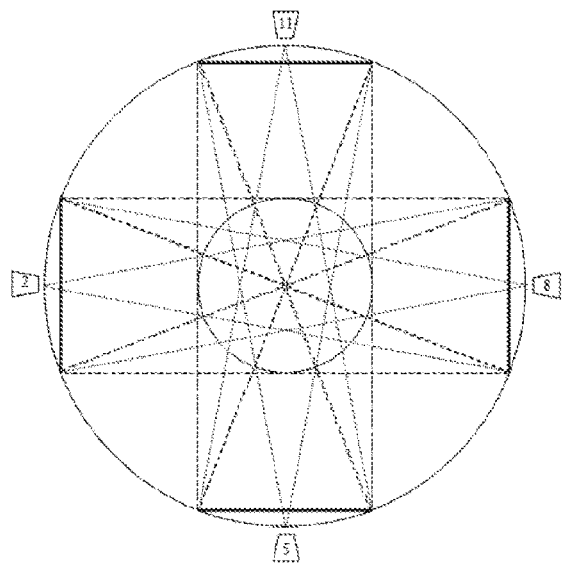
Figure 6C:
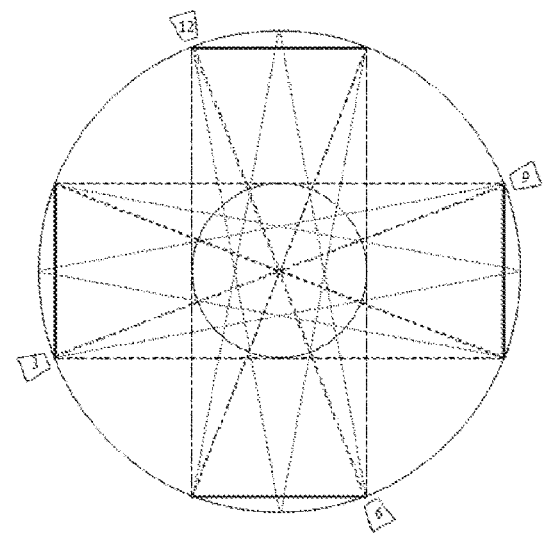

Attention is drawn to FIGS. 6A to 6C showing an embodiment of an X-Ray computed tomography (CT) scanner 10 in which switching on (i.e. activation) of X-Ray tubes may be performed sequentially.

In the shown example, during each activation possibly only one X-ray source in each one of the X-ray "sets" may be activated at a time to form "groups" of tubes not necessarily belonging to the same "sets" that are activated substantially together. Such "grouped" X-ray sources that are activated substantially at the same instance are those tagged 1, 4, 7 and 10 in FIG. 6A; those tagged 2, 5, 8 and 11 in FIG. 6B; and those tagged 3, 6, 9 and 12 in FIG. 6C.

Such sequential activation of the X-ray sources may be combined with rotational motions such as those seen and discussed with respect to FIGS. 5A to 5C, i.e. with "oscillating" CT scanner embodiments or "non-oscillating" CT scanner embodiments that are arranged to rotate in the same direction in order to perform scanning.

Figure 7:
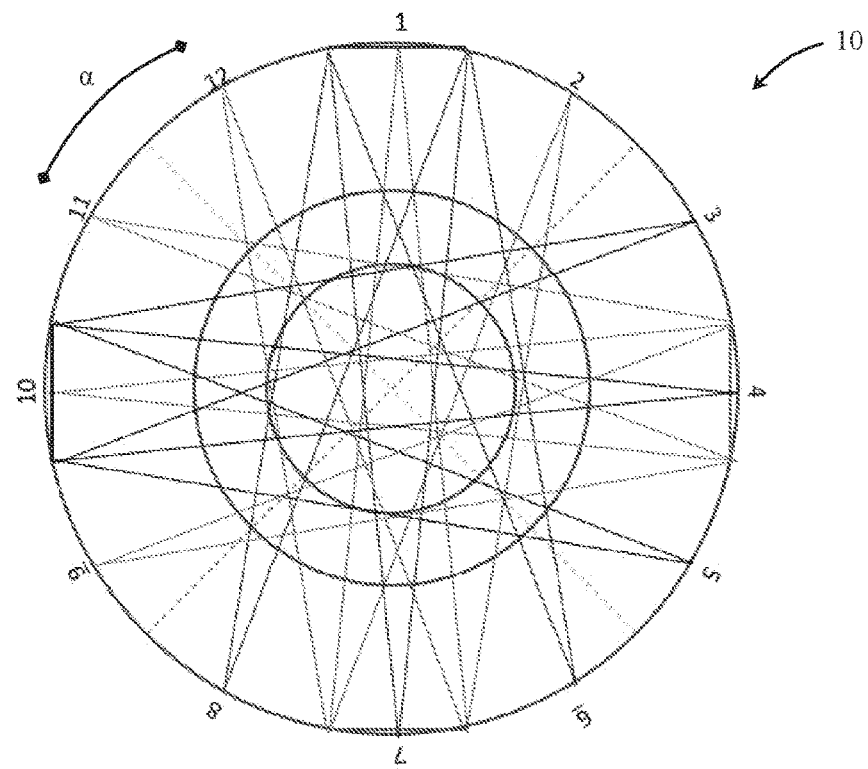
FIG. 7 schematically shows an embodiment of an X-ray computed tomography (CT) scanner including twelve X-Ray sources.

Attention is drawn to FIG. 7 schematically showing an embodiment of an X-ray computed tomography (CT) scanner 10 generally similar to that shown and discussed with respect to FIGS. 4 to 6 but with different angular spacing's between the X-ray tubes. Detectors used within this embodiment, as aforementioned as a possibility, may be of an inverse Geometry type (i.e. detectors that are sized to be smaller than the scanners FOV).

In this CT scanner embodiment, the twelve X-Ray tubes or sources are circumferentially spaced apart one from the other by about an angular spacing A1 in this example of about 30 degrees (i.e. A1=360/12), and the four detectors are circumferentially spaced apart one from the other by about an angular spacing A2 in this example of about 90 degrees (i.e. A2=360/4)—and thus "slice data" of an object located within FOV 14 may be obtained while performing "alpha" sized rotational motions of between about A1 (here about 30°) and about A2 (here about 90°) around the object.

Such arrangement of X-ray sources and detectors as seen in the presented figures, may permit achieving relative high temporal resolutions at relative low rotational motions of the CT scanner.

In order to scan e.g. a dynamic object that is located within FOV 14, such as a heart beating at a rate of about 60 BPM, a temporal resolution of about 0.2 seconds may be preferred in order to capture about 5 sets of "slice data" during a full cycle of the heart from end diastole to end systole and possibly back.

To achieve such a temporal resolution of about 0.2 seconds with the CT scanner shown e.g. in FIG. 7, in this example according to the number of X-Ray tubes a rotation of about 25 RPM may be sufficient (300 RPM/12=25 RPM) and according to the number detectors at rotations of about 75 RPM (300 RPM/4=75 RPM).

Figure 8A:
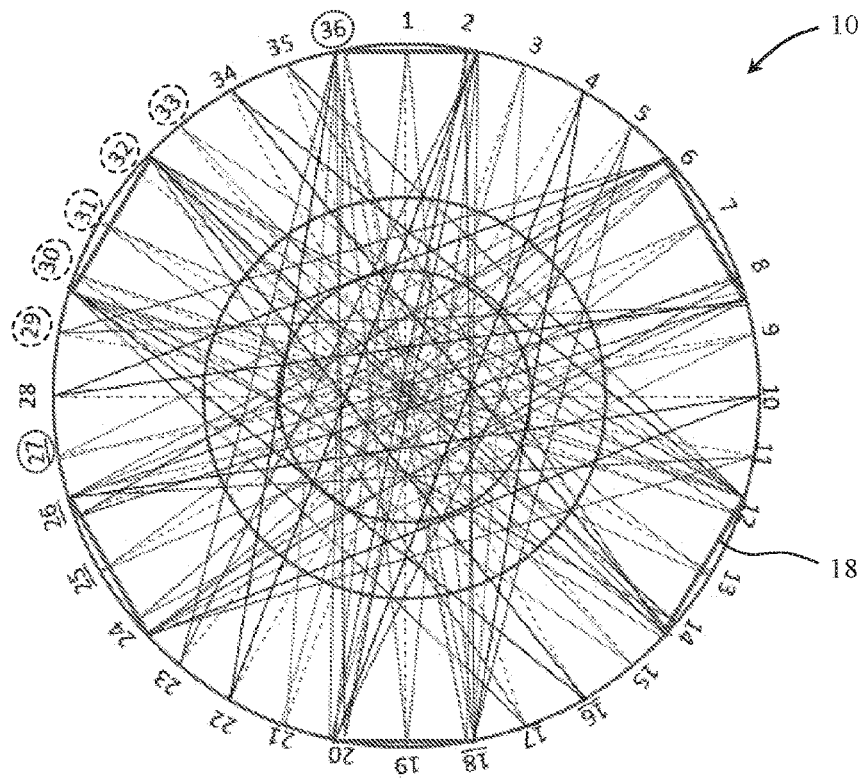
FIGS. 8A and 8B schematically show an embodiment of an X-ray computed tomography (CT) scanner including 6 detectors and thirty six X-Ray sources and possible arrangement of such X-Ray sources in "groups" and "sets", respectively.

Attention is drawn to FIG. 8A schematically showing an embodiment of an X-ray computed tomography (CT) scanner 10 including thirty six X-Ray sources, tagged 1 to 36 and six detectors.

Such arrangement of X-ray sources and detectors as seen in FIG. 8, may permit achieving relative high temporal resolutions at even relative lower rotational motions of the CT scanner. For example, a CT scanner with a single X-ray tube with a temporal resolution of about 0.05 sec per "slice data" should rotate at about 1200 RPM in order to obtain such temporal resolution, while the discussed CT scanner arrangement in FIG. 8A could obtain such a similar temporal resolution of about 0.05 sec per "slice data" while rotating at only between about 33.3 and about 200 RPM (since 1200 RPM divided by 36 X-ray tubes≈33.3 RPM and 1200 RPM divided by 6 detectors≈200 RPM).

With reference to this example it may be seen that X-Ray tubes can be arranged together as "sets" to emit X-ray radiation towards a common similar detector with one such "set" being indicated and its associated detector being marked by numeral 18 in this view. The tubes forming this "set" are the encircled X-ray tubes tagged 27, 29, 30, 31, 32, 33 and 36. As seen in this example, some of the tubes in the "set" (those indicated with the 'dashed' circles and tagged 29, 30, 31, 32, 33) may be located circumferentially adjacent one to the other, while other tubes (those indicated with the 'dotted' circles and tagged 27, 36) may not necessarily be circumferentially adjacent to other tubes of their "set". Choosing tubes not adjacent to other tubes in a similar "set" may assist e.g., in obtaining suitable coverage within the useful field of view of the scanner (or the like).

Figures 8B, 9A:
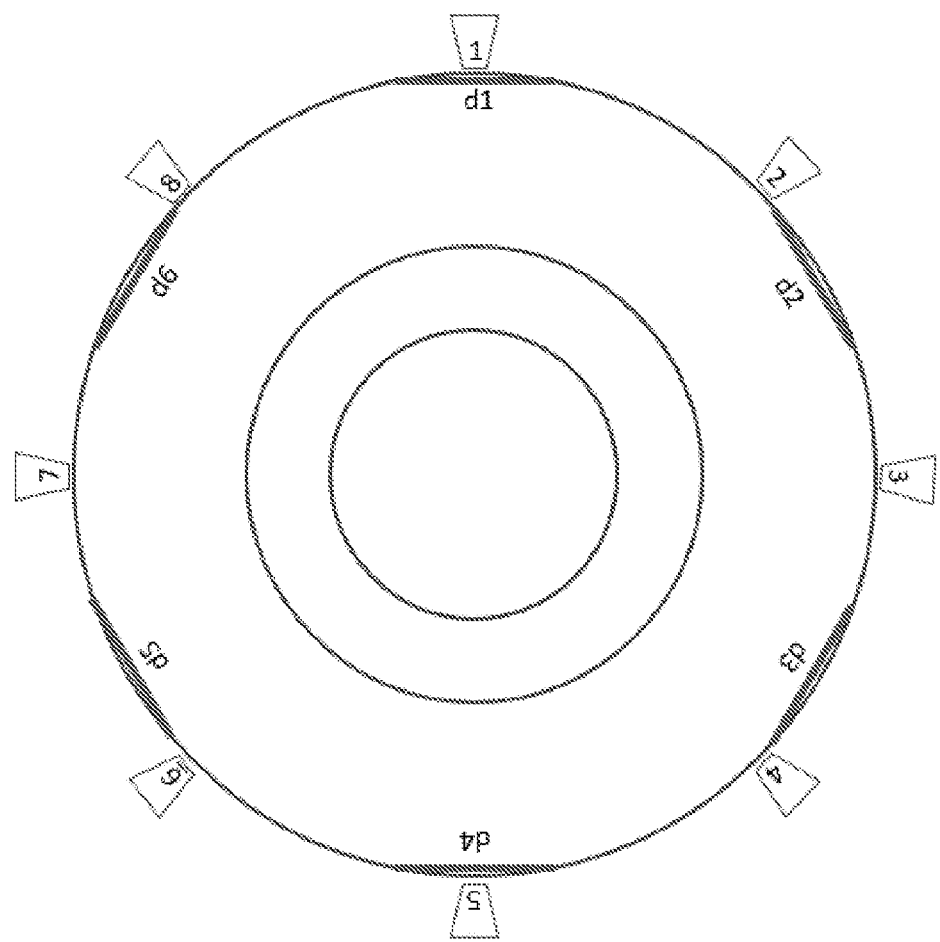
FIGS. 9A to 9C schematically show another embodiment of an X-ray computed tomography (CT) scanner with eight X-ray sources and six detectors, where possible a direction of a fan angle of at least certain X-ray sources may be altered possibly via a controllable collimator.

The table in FIG. 8B illustrates possible division of X-ray tubes into "sets" and "groups" in a CT scanner such as that shown in FIG. 8A that includes thirty six X-ray tubes. As seen in this example, each six circumferentially adjacent X-ray tubes are defined as a "set", while X-ray tubes of different "sets" that form "groups" that are arranged to be activated substantially at the same instance can be seen laid out in the rows of the table.

In at least certain embodiments exhibiting CT scanning while oscillating back and forth, the x-rays and/or the detectors may be arranged to collect data only in one of the rotational directions. Thus, a "non-collecting" phase may be used e.g. to move the table IN (step-&-shoot)—creating a combined oscillatory back and forth and table motion during e.g. the "back" phase. Another option may be to collect all the time during the oscillation back and forth while the table upon which patients are supported moves in to perform Whole Body Scan.

Figure 9B:
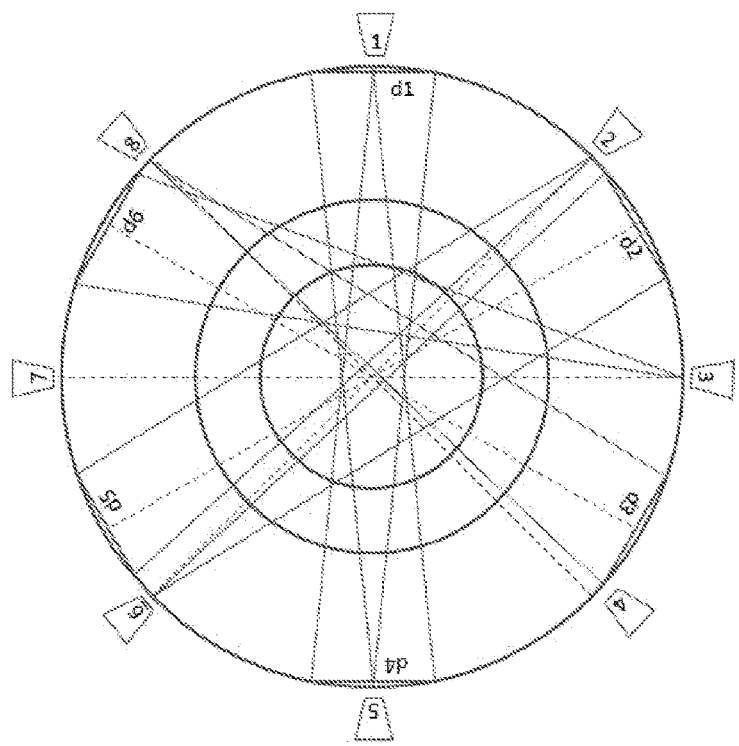
Figure 9C:
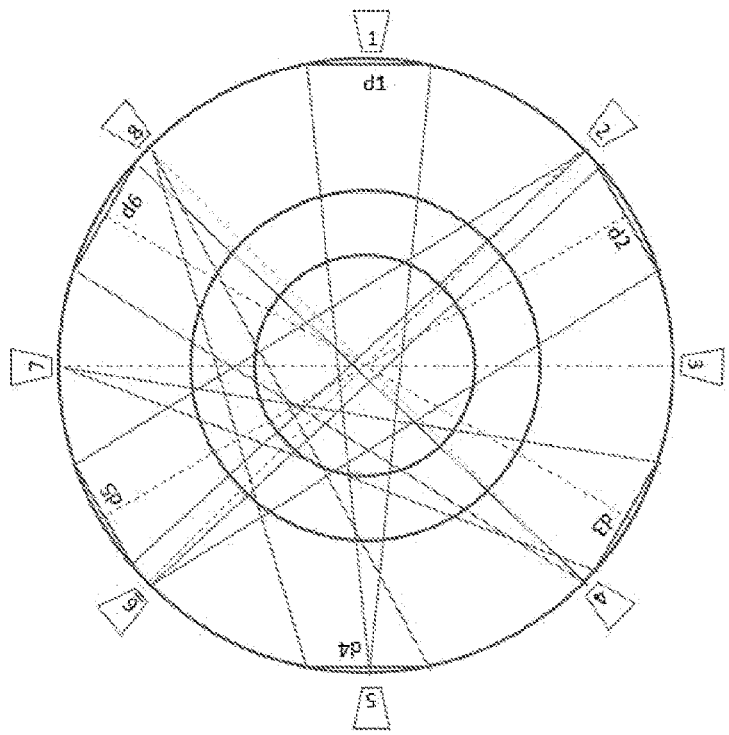

Attention is drawn to FIGS. 9A to 9C schematically showing an embodiment of an X-ray computed tomography (CT) scanner that includes eight X-ray tubes (tagged 1 to 8) and six detectors (tagged d1 to d6). In FIG. 9A all the X-ray tubes are de-activated.

In FIG. 9B a view of the CT scanner is provided where six out of the eight X-ray tubes are activated, while two of the x-ray tubes (in this example the ones tagged 4 and 7) are de-activated.

In FIG. 9C a view of the CT scanner is provided where again six out of the eight X-ray tubes are activated, while two of the x-ray tubes (this time the ones tagged 1 and 3) are de-activated. Also shown in this view is that the X-ray tube tagged 8, which previously (see FIG. 9B) emitted X-ray radiation towards detector d3, now (in FIG. 9C) has been re-directed to emit its radiation towards detector d4. Such re-direction of radiation may be accomplished in one example by controlling a collimator (see 17 in FIG. 3) associated with X-ray source 8 to direct the radiation previously emitted towards detector d3 to now be directed towards detector d4. Another example of controlling the X-Ray Tube 8 and its associated collimator to direct the radiation previously emitted towards detector d3 to now be directed towards detector d4—may be by controlling the X-Ray Tube to tilt.

Figure 10:
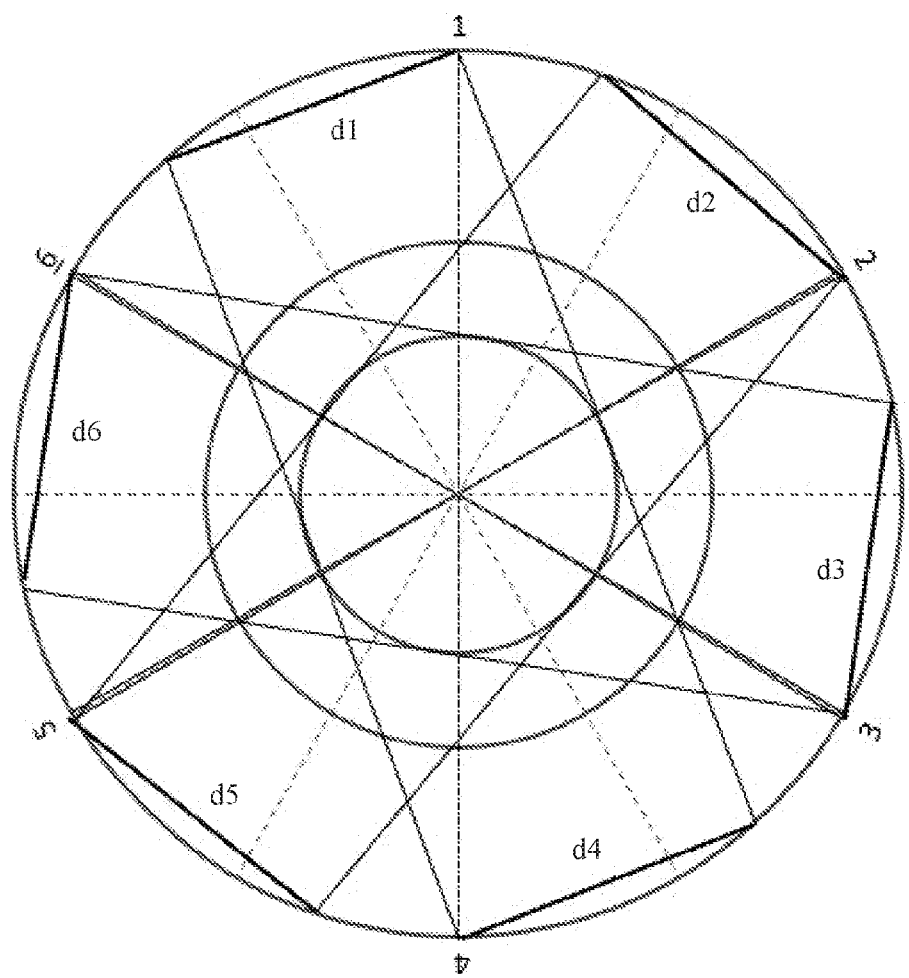
FIG. 10 schematically shows yet another embodiment of an X-ray computed tomography (CT) scanner with six X-Ray tubes and six detectors, where the X-Ray Tubes can be switched sequentially, or any combination of two, three or six at the same time.

Attention is drawn to FIG. 10 schematically showing an embodiment of an X-ray computed tomography (CT) scanner that includes six X-ray tubes (tagged 1 to 6) and six detectors (tagged d1 to d6). Each pair of opposing X-ray tubes, e.g. 1 and 4, are arranged to provide full coverage of the useful field of view (FOV) where scanning takes place. The scanning can be performed while all six X-Ray Tubes are activated sequentially or every combination of pairs, three or all of the six at the same time.

Figure 11:
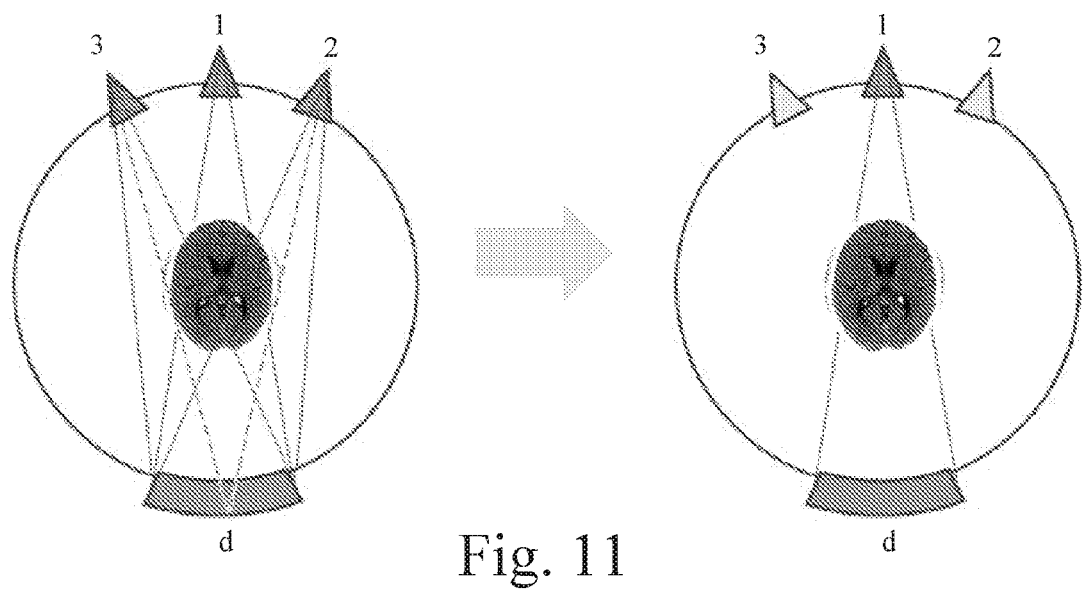
FIGS. 11 to 13 schematically show yet further embodiments of X-ray computed tomography (CT) scanners in accordance with the present disclosure.

Attention is drawn to FIG. 11 schematically showing two side by side views of an embodiment of an X-ray computed tomography (CT) scanner that includes in this example three X-ray tubes tagged 1 to 3 and an opposing detector d. It is noted that a CT scanner of this embodiment may include additional X-ray tubes and detectors as in the various embodiments disclosed herein.

In an embodiment, such CT scanner may be seen exhibiting an adaptive Field Of View—where X-ray tubes may be switched 'on' or 'off' to control the size of the Field Of View (adaptive FOV) for example for smaller organs or people (e.g. children) being scanned.

On the right hand side of the figure, the X-ray tubes tagged 2 and 3 can be seen being switched off so that only (in this example) the central tube tagged 1 is used for directing radiation to a smaller region being scanned (here a patient's head), and by that e.g. exposure to un necessary radiation of organs that are not required to be scanned, such as shoulders of the patient, can be avoided.

Figure 12:
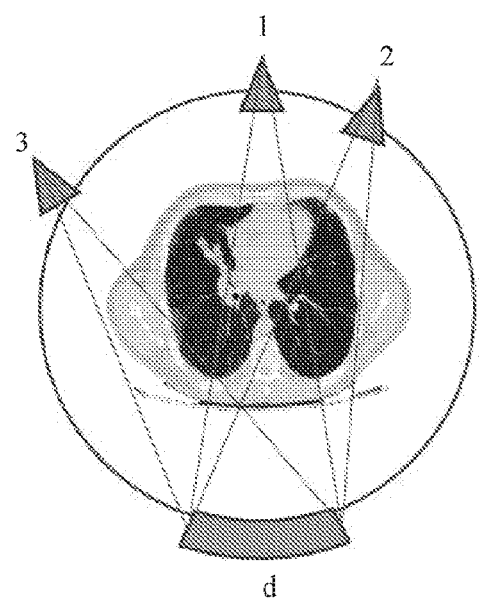

The CT scanner seen in FIG. 12 illustrates an example of a scanning procedure that may be performed where different X-Ray tubes are activated with different current or voltage (power) in order to adapt the radiation to the object being scanned. In this example three X-Ray tubes and a single detector are shown, however it is noted that a CT scanner of this embodiment may include additional X-ray tubes and detectors as in the various embodiments disclosed herein.

While a regular CT scanner may use a so called 'Bowtie filter' that is fixed and typically it is a hardware type filter in order to reduce unnecessary radiation doses to e.g. peripheries of a patient being scanned, CT scanner embodiments of the present disclosure that make use of a plurality of X-Ray tubes—can be controlled to activate certain tubes with different current, e.g. lower current for lower absorption body parts and higher current for high absorption body parts to form a so-called adaptive Bowtie filter that can be controllable by software e.g. by dynamically adjusting the current supplied to each one of the X-ray tubes.

In this example, the tubes tagged 2 and 3 that capture the thinner periphery of the patient may be activated at lower current relative to the more central tube tagged 1 that emits radiation to a thicker section of the patient.

Activating X-ray tubes in lower electrical currents may also assist in avoiding saturation in the detector that receives the radiation, which may harm the scanning.

The voltage at which an X-ray tube is activated can affect the extent of penetration of radiation into the object being scanned. For example, if the portion of the object being scanned during a certain instance comprises mainly bone that is harder to penetrate (as opposed e.g. to lungs)—then the voltage being used opposite the bone may be higher than that when scanning the lungs.

In an embodiment, prior taken scout views obtained for aiding in planning of a subsequent computed tomography (CT) examination, may be used for determining instances during the CT examination where certain tubes of the CT scanner may be activated at different (e.g. lower) powers as discussed.

Figure 13:
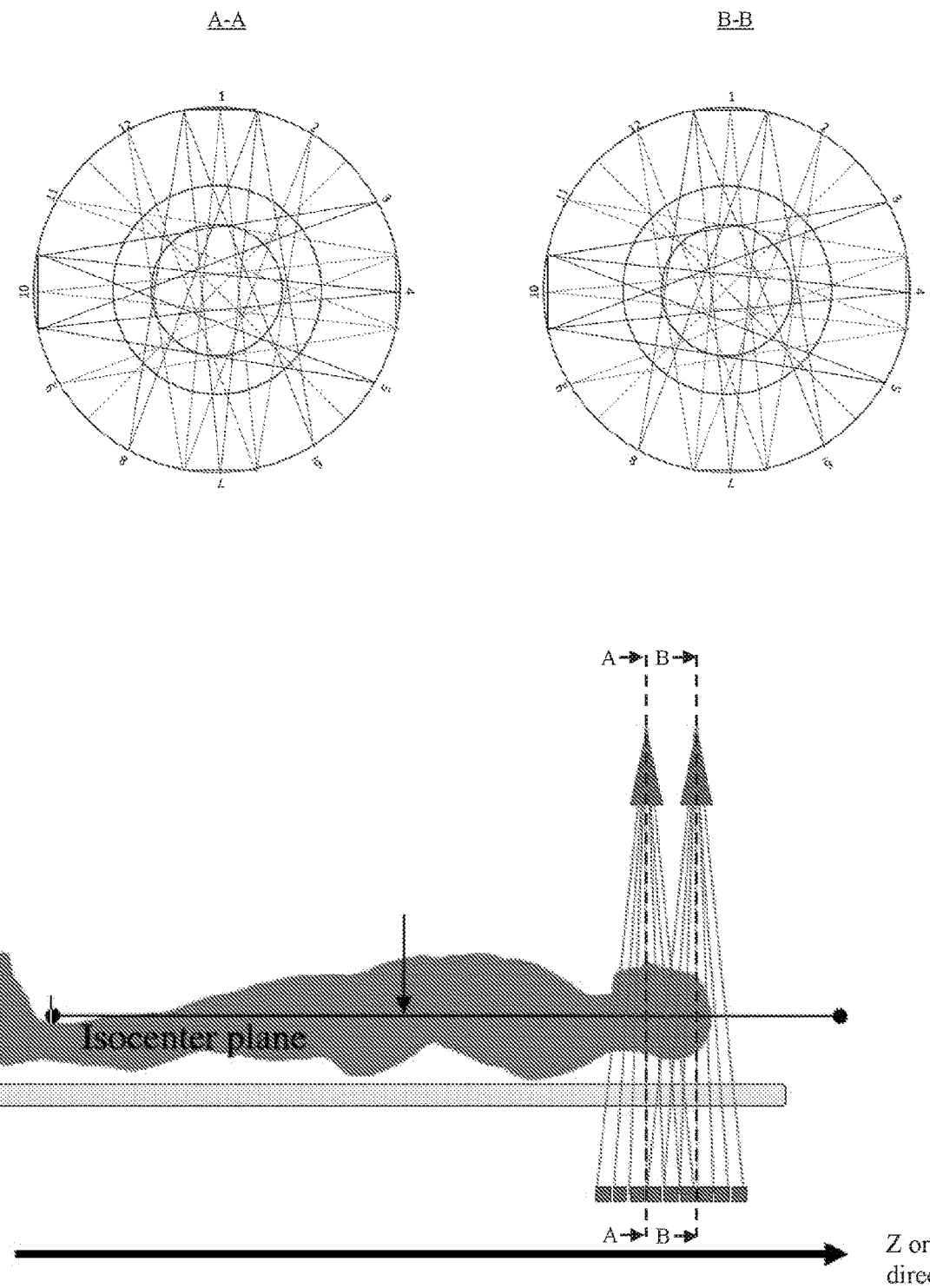

Attention is drawn to FIG. 13 illustrating use of multiple scanning set ups of X-Ray tubes placed one aside the other along the Z direction (which may also be referred to as the R axis direction as indicated in the former figs)—in order to provide a larger FOV of the patient's body while minimizing e.g. the cone beam reconstruction. In the cross sections AA and BB seen in the upper side of the figure, two exemplary scanning set ups of circumferentially spaced apart X-ray tubes (in this example each including 12 tubes) that are located about the patient—can be seen being placed one aside the other in the Z direction.

In an embodiment, axially extending detectors that extend along the Z axis may be used for receiving X-Ray radiation from X-Ray tubes of different axially adjacent setups.

In an embodiment, different tubes may be activated at different voltages in order to separate the energies and by that assist in differentiating different scanned materials and/ or organs one from the other.

In the description and claims of the present application, each of the verbs, "comprise" "include" and "have", and conjugates thereof, are used to indicate that the object or objects of the verb are not necessarily a complete listing of members, components, elements or parts of the subject or subjects of the verb.

Further more, while the present application or technology has been illustrated and described in detail in the drawings and foregoing description, such illustration and description are to be considered illustrative or exemplary and non- restrictive; the technology is thus not limited to the disclosed embodiments. Variations to the disclosed embodiments can be understood and effected by those skilled in the art and practicing the claimed technology, from a study of the drawings, the technology, and the appended claims.

In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures can not be used to advantage.

The present technology is also understood to encompass the exact terms, features, numerical values or ranges etc., if in here such terms, features, numerical values or ranges etc. are referred to in connection with terms such as "about, ca., substantially, generally, at least" etc. In other words, "about 3" shall also comprise "3" or "substantially perpendicular" shall also comprise "perpendicular". Any reference signs in the claims should not be considered as limiting the scope.

Although the present embodiments have been described to a certain degree of particularity, it should be understood that various alterations and modifications could be made without departing from the scope of the invention as hereinafter claimed.

The invention claimed is:

1. An X-ray computed tomography (CT) scanner comprising a scanning setup comprising more than two X-Ray sources and more than two detectors mounted about an opening defining a volume useful field of view (FOV) where scanning takes place,
the X-ray sources being distributed to provide substantially uniform coverage of the FOV by being arranged at angular positions to collectively span 360 degrees around the FOV,
wherein a scanning setup is arranged to rotate about an axis of rotation of the scanner in order to generate scanned slice data of an object located within the opening, wherein
the X-Ray sources are arranged in sets and all X-Ray sources in a certain set are arranged to emit X-ray radiation towards a similar common detector, and wherein
at least some of the detectors are of inverse-geometry CT architecture in that they are sized to be smaller than the scanner's FOV, and wherein
some X-Ray sources are arranged to be sequentially activated during rotation, and during each activation only one X-Ray source in a set is activated, and wherein
the CT scanner is controlled to activate at least some of the X-Ray sources at different powers in order to reduce radiation to a scanned object while obtaining scanned slice data of the object, by determining instances during a CT examination where certain X-Ray sources of the CT scanner are activated at different powers, and wherein a different power comprises providing to the X-Ray source with different current and/or voltage.

2. The CT scanner of claim 1, wherein the detectors are solid state detectors arranged for photon counting.

3. The CT scanner of claim 1, wherein the X-Ray sources and detectors are arranged to rotate in the same rotational direction about the axis of rotation.

4. The CT scanner of claim 3, wherein an angular rotation 'alpha' of less than about 180 degrees, is arranged to provide scanned slice data of an object.

5. The CT scanner of claim 4, wherein scanned slice data comprises one or more slices along the scanner's axis of rotation that are generally one aside to the other.

6. The CT scanner of claim 4, wherein after completing an angular rotation of about 'alpha' the scanner continues to rotate in the same rotational direction an additional angular rotation, also of about 'alpha' in order to obtain additional scanned slice data of the object along the scanner's axis of rotation.

7. The CT scanner of claim 6, wherein 'alpha' is defined between a first angular spacing A1 and a second angular spacing A2, wherein A1=360 degrees divided by the number of X-ray sources and A2=360 degrees divided by the number of detectors.

8. The CT scanner of claim 4, wherein after completing an angular rotation of about 'alpha' in a first rotational direction the scanner oscillates back to rotate in an opposing second rotational direction, also of about 'alpha' in order to obtain additional slice data of the object along the scanner's axis of rotation.

9. The CT scanner of claim 1 and comprising an 'n' number of X-Ray sources and an 'm' number of detectors generally evenly spaced apart one from the other by about 360/'n' for the sources and about 360/'m' for the detectors, and wherein a complete first scanned slice of data of an object is obtained while rotating between about 360/'n' and about 360/'m' around the object and a subsequent complete second scanned slice of data of the same object is obtained while rotating between about 360/'n' and about 360/'m' around the same object in the same rotational direction.

10. The CT scanner of claim 1 and comprising an 'n' number of X-Ray sources and an 'm' number of detectors, at least some of which being non-evenly spaced apart one from the other, and scanned slice data of an object is obtained while rotating between about 360/'n' according to the sources and about 360/'m' according to the detectors around the object.

11. The CT scanner of claim 1, wherein X-Ray sources in a certain set are arranged circumferentially adjacent one to the other.

12. The CT scanner of claim 1, wherein not all X-Ray sources in a certain set are circumferentially adjacent one to the other.

13. The CT scanner of claim 1, wherein at least some of the detectors are regular CT detectors.

14. The CT scanner of claim 13 and being used for imaging and calculating calcium scoring with lower speed of rotation.

15. The CT scanner of claim 1 and being arranged to utilize AI (Artificial Intelligence) based reconstruction methods to assist in creation of additional views to further reduce rotational angles to generate slices.

16. The CT scanner of claim 1, wherein the CT scanner is defined having a maximal field of view (FOV) when all X-ray sources are used for obtaining the scanned slice data, and wherein the CT scanner is configured to adapt a smaller FOV than the maximal FOV by activating only some of the X-ray sources for obtaining the scanned slice data of an object.

17. The CT scanner of claim 1 and comprising an 'n' number of X-Ray sources and an 'm' number of detectors generally evenly spaced apart one from the other by about 360/'n' for the sources and about 360/'m' for the detectors, and wherein scanned slice data of an object is obtained while oscillating between about 360/'n' and about 360/'m' around the object.

18. The CT scanner of claim 17, wherein the 'm' number of detectors is: 4, 6, 8, 12, 24, or 36 and the 'n' number of X-Ray sources is: 4, 6, 8, 12, 24, or 36.

19. An X-ray computed tomography (CT) scanner comprising a scanning setup comprising a plurality of X-Ray sources and detectors mounted about an opening defining a volume useful field of view (FOV) where scanning takes place,
the X-ray sources being distributed to provide substantially uniform coverage of the FOV by being arranged at angular positions to collectively span 360 degrees around the FOV,
wherein the X-Ray sources and detectors are arranged to perform alpha sized rotational motions in the same rotational direction about the scanner's axis of rotation in order to generate scanned slice data of an object located within the opening, wherein
the X-Ray sources are arranged in sets and all X-Ray sources in a certain set are arranged to emit X-ray radiation towards a similar common detector, and wherein
some X-Ray sources are arranged to be sequentially activated during rotation, and during each activation only one X-Ray source in a set is activated, and wherein
at least some of the detectors are of inverse-geometry CT architecture in that they are sized to be smaller than the scanner's FOV, and wherein
the CT scanner is controlled to activate at least some of the X-Ray sources at different powers in order to reduce radiation to a scanned object while obtaining scanned slice data of the object, by determining instances during a CT examination where certain X-Ray sources of the CT scanner are activated at different powers, and wherein a different power comprises providing to the X-Ray source with different current and/or voltage.

20. The CT scanner of claim 19, wherein said alpha is less than about 180 degrees about the scanner's axis of rotation.

21. The CT scanner of claim 20, wherein the detectors are solid state detectors arranged for photon counting.

22. The CT scanner of claim 19, wherein X-Ray sources in a certain set are arranged circumferentially adjacent one to the other.

23. The CT scanner of claim 19, wherein not all X-Ray sources in a certain set are circumferentially adjacent one to the other.

24. The CT scanner of claim 19, wherein at least some X-Ray sources are controlled to emit X-ray radiation towards different detectors in different angles and scans of the object.

25. The CT scanner of claim 24, wherein controlling an X-Ray source to emit radiation towards a different detector than previously is by controlling a collimator or the X-ray source and its associated collimator to direct the emitted radiation towards the different detector.

26. The CT scanner of claim 19 further comprising an 'n' number of X-Ray sources evenly spaced apart one from the other around the scanner's FOV by about 360/'n' degrees.

27. A method for medical imaging comprising the steps of:
providing an X-ray computed tomography (CT) scanner comprising a plurality of X-Ray sources and detectors mounted about an opening defining a volume useful field of view (FOV) where scanning is designed to take place, the X-ray sources being distributed to provide substantially uniform coverage of the FOV by being arranged at angular positions to collectively span 360 degrees around the FOV, locating an object to be scanned within the opening, and performing alpha sized rotational motions in the same rotational direction about the scanner's axis of rotation in order to generate scanned slice data of the object located within the opening, wherein the X-Ray sources are arranged in sets and all X-Ray sources in a certain set are arranged to emit X-ray radiation towards a similar common detector, and wherein some X-Ray sources are arranged to be sequentially activated during rotation, and during each activation only one X-Ray source in a set is activated, and wherein at least some of the detectors are of inverse-geometry CT architecture in that they are sized to be smaller than the scanner's FOV, and wherein the CT scanner is controlled to activate at least some of the X-Ray sources at different powers in order to reduce radiation to a scanned object while obtaining scanned slice data of the object, by determining instances during a CT examination where certain X-Ray sources of the CT scanner are activated at different powers, and wherein a different power comprises providing to the X-Ray source with different current and/or voltage.

28. The method of claim 27, wherein said alpha is less than about 180 degrees about the scanner's axis of rotation.

29. The CT scanner of claim 28, wherein 'alpha' is defined between a first angular spacing A1 and a second angular spacing A2, wherein A1=360 degrees divided by the number of X-ray sources and A2=360 degrees divided by the number of detectors.

* * * * *